(12) United States Patent
Hong et al.

(10) Patent No.: US 8,764,320 B2
(45) Date of Patent: Jul. 1, 2014

(54) LIGHT SCREENING APPARATUS AND FABRICATING METHOD THEREOF

(75) Inventors: Seog-Woo Hong, Suwon-si (KR); Che-Heung Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/451,273

(22) Filed: Apr. 19, 2012

(65) Prior Publication Data

US 2012/0328281 A1  Dec. 27, 2012

(30) Foreign Application Priority Data

Jun. 24, 2011 (KR) .................. 10-2011-0061747

(51) Int. Cl.
  *G03B 9/02* (2006.01)
(52) U.S. Cl.
  USPC .......................................... 396/505; 359/230
(58) Field of Classification Search
  USPC .................. 396/480, 505, 481, 479; 359/230
  See application file for complete search history.

(56) References Cited

U.S. PATENT DOCUMENTS

| | | | |
|---|---|---|---|
| 3,989,357 A | 11/1976 | Kalt | |
| 4,235,522 A * | 11/1980 | Simpson et al. | 359/230 |
| 4,248,501 A | 2/1981 | Simpson | |
| 4,266,339 A * | 5/1981 | Kalt | 29/829 |
| 5,233,459 A | 8/1993 | Bozler et al. | |
| 5,605,609 A | 2/1997 | Ando et al. | |
| 5,646,770 A | 7/1997 | Sato et al. | |
| 5,781,331 A * | 7/1998 | Carr et al. | 359/288 |
| 5,847,454 A | 12/1998 | Shaw et al. | |
| 5,959,763 A | 9/1999 | Bozler et al. | |
| 6,067,183 A * | 5/2000 | Furlani et al. | 359/254 |
| 6,226,116 B1 | 5/2001 | Dowe et al. | |
| 6,313,937 B1 | 11/2001 | Dowe et al. | |

(Continued)

FOREIGN PATENT DOCUMENTS

| | | |
|---|---|---|
| EP | 1 008 885 A1 | 6/2000 |
| EP | 1 241 508 A2 | 9/2002 |

(Continued)

OTHER PUBLICATIONS

Extended European Search Report, dated Sep. 10, 2010, issued by the European Patent Office in counterpart European Application No. 10155823.7.

(Continued)

*Primary Examiner* — Clayton E LaBalle
*Assistant Examiner* — Warren K Fenwick
(74) *Attorney, Agent, or Firm* — Sughrue Mion, PLLC

(57) ABSTRACT

A light screening apparatus and a method of fabricating the same are provided. The light screening apparatus includes: a base plate including a first electrode; at least one material layer on the base plate; a rollup blade including a second electrode and configured to be disposed corresponding to a light transmitting portion of the base plate; a driving unit configured to be electrically connected to the first electrode and the second electrode; and a sticking prevention structure which prevents sticking between the rollup blade and the material layer. The sticking prevention structure may refer to a surface structure of at least one of the rollup blade and the material layer or a sticking prevention layer or a sticking prevention pattern which is additionally formed on at least one of an outer circumference surface of the rollup blade and a surface of the material layer.

37 Claims, 15 Drawing Sheets

(56) References Cited

U.S. PATENT DOCUMENTS

| | | | |
|---|---|---|---|
| 6,443,637 B1 * | 9/2002 | Dowe | 396/505 |
| 6,586,738 B2 | 7/2003 | Dausch et al. | |
| 6,594,058 B2 | 7/2003 | Flanders | |
| 6,972,889 B2 * | 12/2005 | Goodwin-Johansson et al. | 359/290 |
| 7,436,102 B2 * | 10/2008 | Fujii et al. | 310/324 |
| 7,766,563 B2 | 8/2010 | Wakabayashi | |
| 8,061,910 B2 * | 11/2011 | Kim et al. | 396/481 |
| 8,147,150 B2 * | 4/2012 | Kim et al. | 396/481 |
| 8,313,663 B2 * | 11/2012 | Hautala | 216/58 |
| 2003/0203237 A1 | 10/2003 | Webb et al. | |
| 2004/0046123 A1 | 3/2004 | Dausch | |
| 2006/0078331 A1 | 4/2006 | Masuda | |
| 2006/0196613 A1 | 9/2006 | Lamontagne et al. | |
| 2007/0279558 A1 | 12/2007 | Chang | |
| 2009/0142050 A1 | 6/2009 | Kim et al. | |
| 2010/0118373 A1 * | 5/2010 | Kim | 359/230 |
| 2010/0142024 A1 * | 6/2010 | Kim | 359/230 |
| 2010/0290101 A1 * | 11/2010 | Kim et al. | 359/230 |
| 2010/0330468 A1 * | 12/2010 | Kwon et al. | 430/5 |
| 2011/0170158 A1 * | 7/2011 | Hong et al. | 359/230 |
| 2012/0154887 A1 * | 6/2012 | Kim | 359/230 |

FOREIGN PATENT DOCUMENTS

| | | | |
|---|---|---|---|
| EP | 1241507 A2 | 9/2002 | |
| JP | 08-220592 A | 8/1996 | |
| JP | 11-72722 A | 3/1999 | |
| JP | 11-167078 A | 6/1999 | |
| JP | 2008-40006 A | 2/2008 | |
| KR | 1998-016031 A | 5/1998 | |
| KR | 10-2007-0030871 A | 3/2007 | |
| KR | 10-2009-0055996 A | 6/2009 | |
| WO | 89/01217 A1 | 2/1989 | |
| WO | 2006/099512 A2 | 9/2006 | |

OTHER PUBLICATIONS

Extended European Search Report, dated Aug. 6, 2012, issued by the European Patent Office in counterpart European Application No. 11193763.7.

Communication, dated Nov. 15, 2013, issued by the European Patent Office in counterpart European Patent Application No. 11 193 763.7.

Non-Final US Office Action, dated Sep. 6, 2013, issued by the USPTO in related U.S. Appl. No. 13/230,058.

Non-Final US Office Action, dated Dec. 5, 2013, issued by the USPTO in related U.S. Appl. No. 12/907,236.

Advisory Action, dated Aug. 2, 2013, issued by the USPTO in related U.S. Appl. No. 12/907,236.

Final US Office Action, dated Apr. 25, 2013, issued by the USPTO in related U.S. Appl. No. 12/907,236.

Non-Final US Office Action, dated Dec. 7, 2012, issued by the USPTO in related U.S. Appl. No. 12/907,236.

Restriction/Election Requirement, dated Sep. 14, 2012, issued by the USPTO in related U.S. Appl. No. 12/907,236.

Notice of Allowance, dated Jul. 14, 2011, issued by the USPTO in related U.S. Appl. No. 12/134,324.

Final US Office Action, dated Nov. 15, 2010, issued by the USPTO in related U.S. Appl. No. 12/134,324.

Non-Final US Office Action, May 14, 2010, issued by the USPTO in related U.S. Appl. No. 12/134,324.

Notice of Allowance, dated Jun. 28, 2013, issued by the USPTO in related U.S. Appl. No. 12/692,285.

Restriction/Election Requirement, Jan. 3, 2013, issued by the USPTO in related U.S. Appl. No. 12/692,285.

Communication dated Feb. 26, 2014, issued by the United States Patent and Trademark Office in counterpart U.S. Appl. No. 13/230,058.

* cited by examiner

LIGHT SCREENING APPARATUS AND FABRICATING METHOD THEREOF

CROSS-REFERENCE TO RELATED APPLICATION

This application claims priority under 35 U.S.C. §119(a) from Korean Patent Application No. 10-2011-0061747, filed on Jun. 24, 2011 in the Korean Intellectual Property Office, the entire disclosure of which is incorporated herein by reference for all purposes.

BACKGROUND

1. Field

Apparatuses and methods consistent with exemplary embodiments relate to an optical apparatus and a method of manufacturing the same, and more particularly, to a light screening apparatus and a method of manufacturing the same.

2. Description of the Related Art

An optical screening apparatus is any type of apparatus for screening light. An optical shutter, which is one type of optical screening apparatuses, selectively allows light to pass therethrough. For example, the optical shutter in a camera may block or allow the passage of light that has passed through a camera lens toward an image sensor. In addition, the optical shutter may control at least one of a time at which the light is received and an amount of light to be received by adjusting at least one of an operation speed and a screening area of the camera lens (i.e., an opening size of the camera lens). The optical screening apparatus such as the optical shutter may be applicable to any electronic devices other than cameras (e.g., an optical switching device) which utilize a temporal, permanent or selective light screening function.

The optical shutter may be classified into a mechanical type and an electronic type. The electronic optical shutter enables to control at least one of an image sensor to receive light and the time of the image sensor's receiving of the light by controlling an operation state of the image sensor. Since the electronic optical shutter is driven by circuitry, the electronic optical shutter has been generally used for a portable digital camera having a limitation in camera module size. However, as the number of pixels of a camera module in the electronic optical shutter increases, moving object distortion may occur.

In light of recent increases in the resolution of the camera module embedded in a mobile device, attention has again been drawn to a mechanical optical shutter. Since electronic devices including digital cameras are becoming compact and thin, the mechanical optical shutter must also be small and thin and provide a quick response (i.e., shuttering) speed. Korean Patent Application No. 2009-0055996, titled "SHUTTER AND MICROCAMERA MODULE HAVING THE SAME," incorporated herein by reference in its entirety, introduces an example of a mechanical optical shutter which can provide a quick response speed using a plurality of roll-up blades.

The mechanical optical shutter may be driven by an electrostatic force. To be specific, when a driving voltage is not applied, the mechanical optical shutter maintains a roll-up blade in a roll-up condition, and at this time, light is allowed to pass through a light transmission portion of a substrate. In addition, when a driving voltage is applied between a lower electrode (e.g., a transparent substrate) and an upper electrode (e.g., a roll-up blade), an electrostatic force is generated, thereby flattening the roll-up blade. The flattened roll-up blade blocks the light transmission portion of the substrate, and thus the light can be screened.

SUMMARY

One or more exemplary embodiments provide a light screening apparatus and a fabricating method thereof, which can prevent a sticking phenomenon occurring during long-term use of a roll-up blade.

According to an aspect of an exemplary embodiment, there is provided a light screening apparatus including: a base plate including a first electrode; at least one material layer on the base plate; a rollup blade configured to be disposed corresponding to a light transmitting portion of the base plate and to include a second electrode; a driving unit configured to be electrically connected to the first electrode and the second electrode; and a sticking prevention structure provided to prevent sticking between the rollup blade and the at least one material layer.

According to an aspect of another exemplary embodiment, there is provided a method of fabricating a light screening apparatus, the method including: preparing a base plate having a light transmitting portion; providing at least one material layer on the base plate; providing a sacrificial layer on the at least one material layer to cover at least the light transmitting portion; increasing a surface roughness of the sacrificial layer or forming at least one of a protruding portion and a recess portion on the sacrificial layer; providing a rollup blade on the sacrificial layer; and removing the sacrificial layer.

According to an aspect of another exemplary embodiment, there is provided a method of fabricating a light screening apparatus, the method including: preparing a base plate having a light transmitting portion; providing at least one material layer on the base plate; providing a sacrificial layer on the at least one material layer to cover at least the light transmitting portion; providing a metal thin film on the sacrificial layer; forming a sticking prevention layer with a porous structure by performing a plasma process; providing a rollup blade on the sticking prevention layer; and removing the sacrificial layer.

According to an aspect of another exemplary embodiment, there is provided a light screening apparatus including: a base plate including a first electrode; at least one material layer on the base plate; a rollup blade including a second electrode, and configured to be disposed corresponding to a light transmitting portion of the base plate; and a sticking prevention structure which reduces a contact surface area between the rollup blade and the at least one material layer when the rollup blade is in a flattened state to screen light.

Other features and aspects may be apparent from the following detailed description, the drawings, and the claims.

Figure 1:
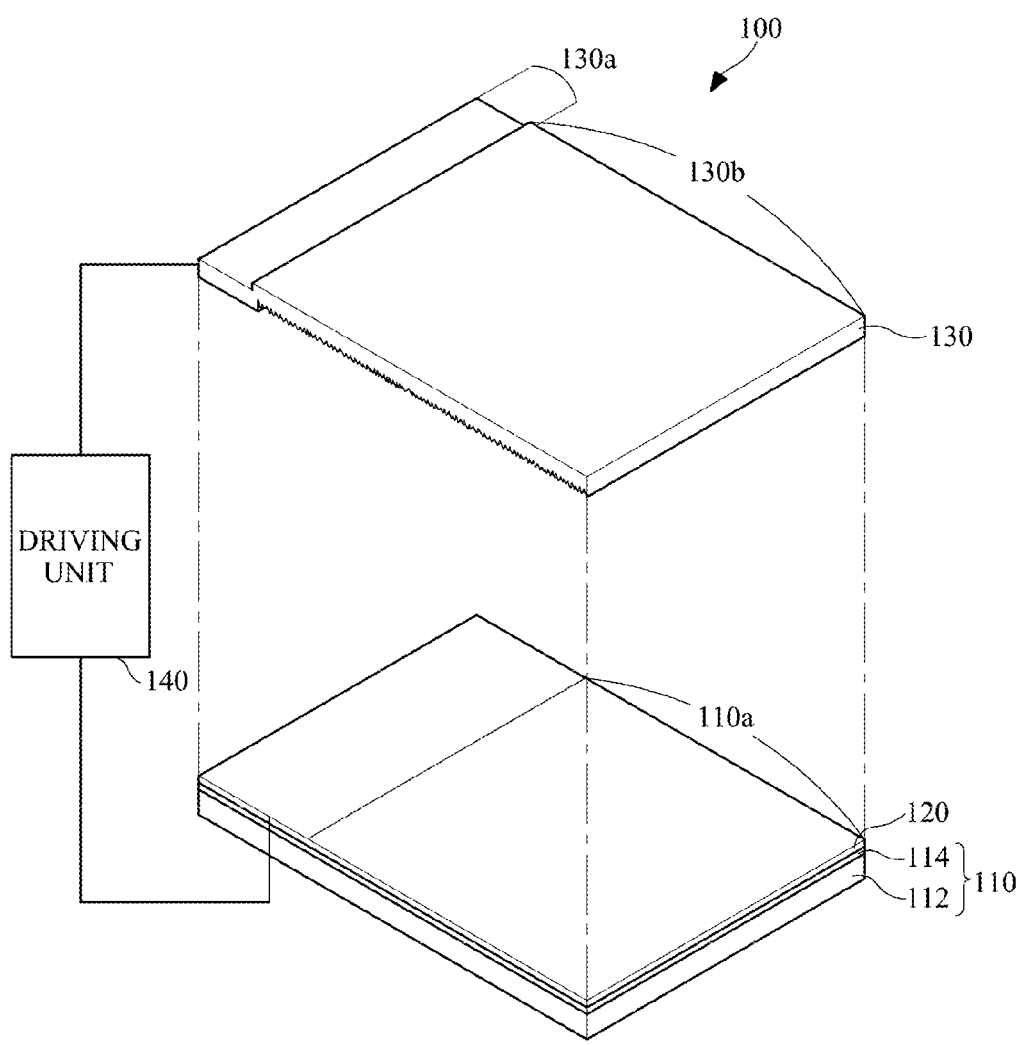
FIG. 1 is a perspective view showing an example of a light screening apparatus which is shuttering light according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF EXEMPLARY EMBODIMENTS

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness. Expressions such as "at least one of," when preceding a list of elements, modify the entire list of elements and do not modify the individual elements of the list.

Figure 2:
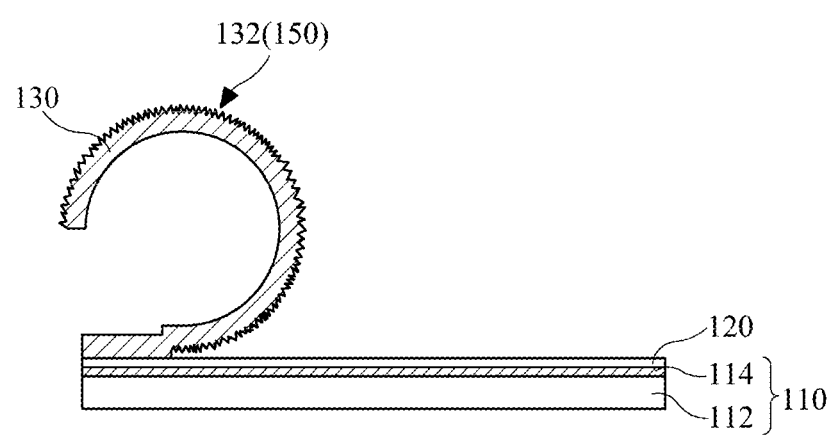
FIG. 2 is a cross-sectional view showing the example of the light screening apparatus shown in FIG. 1 which is in a state to allow the transmission of light according to an exemplary embodiment.

FIG. 1 illustrates a perspective view of an example of a light screening apparatus 100 according to an exemplary embodiment, and FIG. 2 illustrates a cross-sectional view of the example of the light screening apparatus 100 shown in FIG. 1. The light screening apparatus 100 shown in the example illustrated in FIG. 1 is in a state to screen light, and the light screening apparatus 100 shown in the example illustrated in FIG. 2 is in a state to allow the passage of light. In addition, for convenience of description, a roll-up blade 130 is illustrated to be separated from a base plate 110 and a material layer 120. The optical screening apparatus 100, itself, may operate as a full optical shutter, or may be a part of an optical shutter (see FIGS. 4A and 4B).

Referring to FIGS. 1 and 2, the light screening apparatus 100 may include a base plate 110, a material layer 120, a rollup blade 130, and a driving unit 140 (for convenience of illustration, the driving unit 140 is not shown in FIG. 2). Additionally, the optical screening apparatus 100 may further include a sticking prevention structure 150 for preventing the rollup blade 130 from being stuck to the material layer 120. The sticking prevention structure 150 may refer to inherent surface characteristics of at least one of the material layer 120 and the rollup blade 130, or an additional material layer or material pattern which is formed on at least one of the material layer 120 and the rollup blade 130, which will be described below. Moreover, the sticking prevention structure 150 may refer to a combination of inherent surface characteristics of at least one of the material layer 120 and the rollup blade 130, and an additional material layer or material pattern which is formed on at least one of the material layer 120 and the rollup blade 130.

The base plate 110 may include a light transmitting portion 110a that allows light to pass therethrough, and the light transmitting portion 110a may be transparent or translucent. The light transmitting portion 110a allows light to pass therethrough when the rollup blade 130 is rolled up as shown in FIG. 2. For example, in the case in which the light screening apparatus 100 operates as an optical shutter of an imaging apparatus (see FIG. 5), the light transmitting portion 110a of the base plate 110 may be placed on an optical path, and thus the light passing through the light transmitting portion 110a may reach an image sensor via an optical lens. Additionally, when the rollup blade 130 is driven as shown in FIG. 1, the flattened rollup blade 130 may partially or entirely block the light transmitting portion 110a, and hence the amount of light to pass through the light transmitting portion 110a can be adjusted. The rest of the base plate 110 other than the light transmitting portion 110a may be optically transparent or opaque.

The base plate 110 may be of a flat shape as shown in the example illustrated in FIG. 1, which is provided for explanatory purposes. It is understood that according to one or more other exemplary embodiments, the base plate 110 may be of nearly any other shape without limitation (e.g., a curved shape, a bent shape, a wavy shape or the like). Moreover, the light transmitting portion 110a is not limited in its shape, and may be rectangular, circular, oval, polygonal, fan-shaped, etc.

The base plate 110 may include a substrate 112 and a lower electrode 114. The whole of the substrate 112 may be formed of transparent or translucent material, or at least a part of the substrate 112 that includes the light transmitting portion 110a may be made of transparent or translucent material. The substrate 112 may be a glass substrate, but is not limited thereto, and the substrate 112 may be formed of, for example, quartz, plastic, silica, or the like in one or more other exemplary embodiments.

The lower electrode 114 may be transparent or translucent electrically conductive material. For example, the lower electrode 114 may include Indium Tin Oxide (ITO), or transparent or translucent ZnO, $SnO_2$, carbon nano tube (CNT), a conductive polymer, etc. The lower electrode 114 may be electrically connected with the driving unit 140 to operate as a driving electrode for driving the light screening apparatus 100, and more particularly, the rollup blade 130.

The lower electrode 114 may be formed on a top surface of the substrate 112. In addition, the lower electrode 114 may be formed to cover the entire surface of the light transmitting portion 110a or to cover a part of the light transmitting portion 110 with a predefined pattern. Generally, when the lower electrode 114 is designed to cover the entire surface of the light transmitting portion 110, a stronger force may be generated between the lower electrode 114 and the rollup blade 130 than when the lower electrode 114 is designed to cover a part of the light transmitting portion 110. The stronger force between the lower electrode 114 and the rollup blade 130 may result in faster movement (or response) of the rollup blade 130 between a rollup state and a flattened state. However, the lower electrode 114 is not limited to the above example, and the lower electrode 114 may be formed to cover a part of the light transmitting portion 110a or to cover the light transmitting portion 110a and a peripheral area of the light transmitting portion 110a according to one or more other exemplary embodiments. The lower electrode 114 may be of a thickness of about 1000 to about 3000 angstroms (Å), for example, about 2000 Å, which is only explanatory and it is understood that one or more other exemplary embodiments are not limited thereto.

As exemplified in FIGS. 1 and 2, one or more material layers 120 are formed on the base plate 110. The material layer 120 may also be formed of light transmitting material, or a combination of transparent and opaque portions. For example, the material layer 120 may be formed of transparent or translucent SiO, SiN, or AN. The material layer 120 may not only protect the lower electrode 114 of the base plate 110, but also prevent electric conduction between the lower electrode 114 and the rollup blade 130 due to physical contact therebetween. To this end, the material layer 120 may include one or more insulating layers. The material layer 120 may be of a thickness of about 1000 to about 2000 Å, for example, about 1500 Å, which is only explanatory and it is understood that one or more other exemplary embodiments are not limited thereto.

The rollup blade 130 is disposed above the base plate 110. The rollup blade 130 may remain rolled up with a predefined curvature if no driving force is applied between the rollup blade 130 and the base plate 110 (see FIG. 2). While the rollup blade 130 is rolled up, at least the light transmitting portion 110a of the base plate 110 is exposed so that incident light may pass through the light transmitting portion 110a. On the other hand, when a predefined driving force is applied between the rollup blade 130 and the base plate 110, the rollup blade 130 is flattened (see FIG. 1). When the rollup blade 130 is flattened, the light transmitting portion 110 of the base plate 110 is covered by the rollup blade 130. However, unlike the example shown in FIG. 1, the light transmitting portion 110 may be partially concealed by the rollup blade 130 by adjusting the degree of flattening the rollup blade 130 (not illustrated).

Figure 4A:
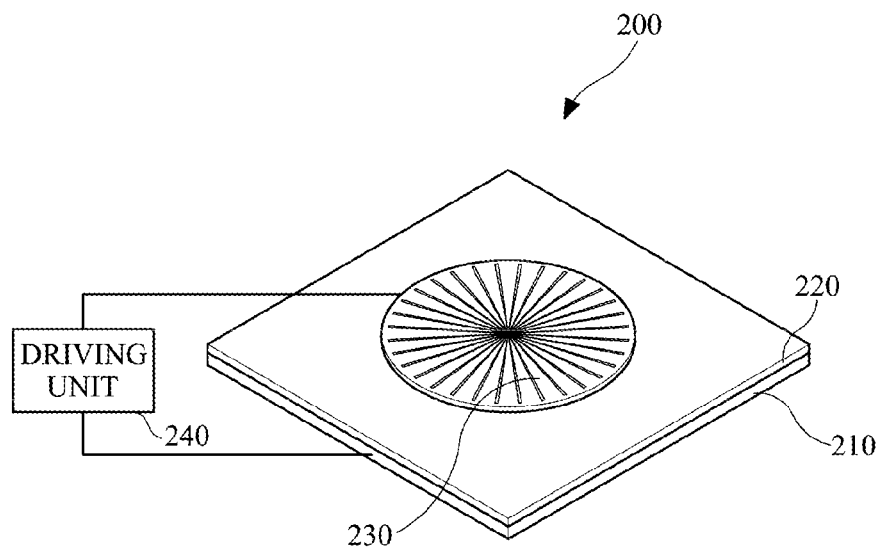
FIG. 4A is a perspective view showing another example of a light screening apparatus in a state to shutter light according to an exemplary embodiment.
Figure 4B:
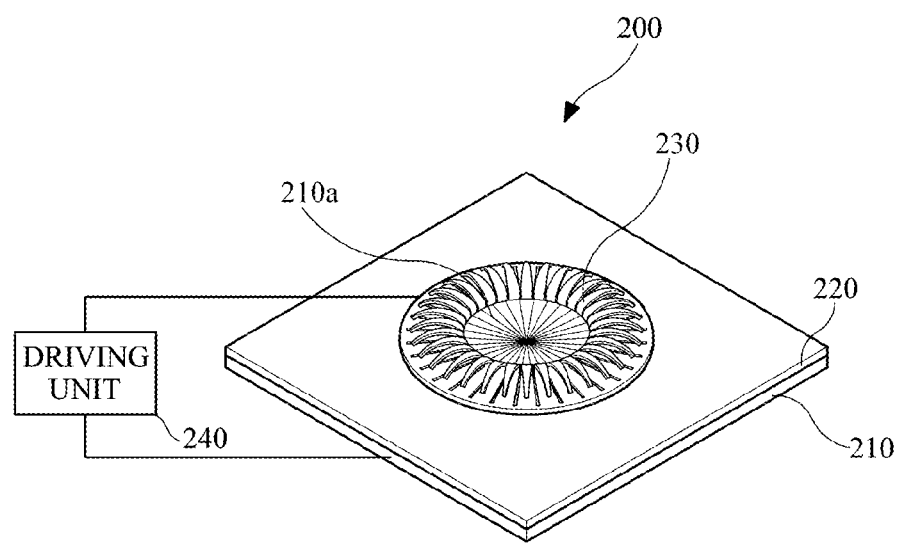
FIG. 4B is a perspective view showing an example of a light screening apparatus in a state to allow the transmission of light according to an exemplary embodiment.

As shown in the example illustrated in FIG. 1, the flattened rollup blade 130 may prevent light from passing through the light transmitting portion 110a. To this end, the rollup blade 130 may include at least one material layer that prevents light transmission in order to screen incident light. In addition, the light screening apparatus 100 may include a single rollup blade 130, as shown in FIGS. 1 and 2, which is large enough to cover the whole light transmitting portion 110a, or may include a plurality of rollup blades that cover the light transmitting portion 110a by dividing into plural regions, as shown in FIGS. 4A and 4B.

The rollup blade 130 may include a fixing portion 130a and a moving portion 130b. The fixing portion 130a of the rollup blade 130 may be attached to the material layer 120 and fixed to an edge portion of the base plate 110, which is placed outside of the light transmitting portion 110a. As another example, the fixing portion 130a may be fixed to the outside of the base plate 110 or in a structure (not shown) included in the light screening apparatus 100. The moving portion 130b is the remaining portion of the rollup blade 130 other than the fixing portion 130a, and is flattened or rolled up under the control of the driving unit 140.

In response to a driving voltage applied by the driving unit 140, opposite electrical potentials are formed between the base plate 110 and the rollup blade 130, more specifically, between the lower electrode 114 and the rollup blade 130 which operates as an upper electrode, and consequently an attractive force is generated between the base plate 110 and the rollup blade 130. Due to the presence of the attractive force, the moving portion 130b may change from the rolled-up state to a flattened state and cover the light transmitting portion 110a. The rollup blade 130 may include an upper electrode which is formed of a single conductive material or is formed as multiple layers made of two or more conductive materials such that the attractive force can be exerted thereon. To be specific, the rollup blade 130 may include a thin film formed as a single layer or a plurality of layers, each made of a single material. For example, the rollup blade 130 may be formed as a single layer or two or more layers, each of which is made of opaque metal material such as Mo, Al, Ti, Ta, Cr, Au, Cu, and the like, or an alloy of these materials.

In response to removal of the driving voltage applied by the driving unit 140, the moving portion 130b of the rollup blade 130 returns to a rolled-up state. To this end, the rollup blade 130 formed as a single thin layer may be configured to have an inner stress gradient focusing on an upper portion of the thin layer to enable the rollup blade 130 to spontaneously roll up with a predefined curvature. In a case in which the rollup blade 130 is formed as multiple thin films, the rollup blade 130 may be configured to have a residual stress difference between an upper thin film and a lower thin film. For example, in a case where the upper thin film has tensile residual stress, the lower thin film may have compressive residual stress, no residual stress, or tensile residual stress which is less than the tensile residual stress in the upper thin film.

As described above, the light transmitting apparatus 100 may further include the sticking prevention structure 150 that prevents the rollup blade 130 from being stuck to the material layer 120. The electrostatic light screening apparatus 100 may include the material layer 120 including an insulating layer to prevent the physical contact between the lower electrode 114 and the rollup blade 130. Repetitive driving of the light screening apparatus 100 may cause dielectric charging in which electric charge is captured in the insulating layer. In addition, the amount of electric charges accumulated in the insulating layer increases with the duration for which the dielectric charging lasts. Consequently, even when the driving voltage is removed, the rollup blade 130 may be stuck onto the material layer 120 and not return to an original state (i.e., rolled-up state). Such sticking phenomenon may reduce the life-time of the light screening apparatus 100, and hence the sticking prevention structure 150 is provided to prevent the sticking and thereby increase the life-time of the rollup blade 100.

In the examples illustrated in FIGS. 1 and 2, the rollup blade 130 may have a rough outer circumference surface 132, as an example of the sticking prevention structure 150. The 'rough surface' may refer to surface properties from a particular scale view (e.g., a microscale view), and is a concept contrary to a fine surface or a smooth surface with average roughness of less than several tens of nanometers. The rough outer circumference surface 132 may have a roughness (i.e., distance from peak to valley) of about 30 nm or more, e.g., about 50 nm to about 1,000 nm, which is only explanatory and it is understood that one or more other exemplary embodiments are not limited thereto. Due to the rough outer circumference surface 132 of the rollup blade 130, an actual contact area between the rollup blade 130 and the material layer 120 is reduced. Accordingly, although a great amount of electric charges are accumulated on the material layer 120, the sticking phenomenon of the rollup blade 130 may be prevented or at least be reduced.

The rough outer circumference surface 132 of the rollup blade 130 may be beneficial to the reduction of scattered reflection. If the outer circumference surface 132 of the rollup blade 130 is smooth, most of the incident light may be reflected from the outer circumference surface 132. Some of the reflected light may proceed to the outside of the rollup blade 130, or other reflected light, particularly, the light reflected from a side of the rollup blade 130 in a rolled-up state, (a part of the rollup blade 130 which is perpendicular to the light transmitting potion 110*a*) may pass through the light transmitting portion 110*a*. The reflected light passing through the light transmitting portion 110*a* is an undesired optical element. For example, if the light screening apparatus 100 is used as an optical shutter of an imaging device, the reflected light as described above is received by an image sensor, resulting in a ghost image.

To prevent reflected light from passing through the light transmitting portion 110*a*, the rollup blade 130 may be disposed relatively far apart from the light transmitting portion 110*a*. As a distance between the rollup blade 130 and the light transmitting portion 110*a* increases, a size (a length) of the rollup blade 130 is increased because an aperture size is increased. In this case, the response speed of the rollup blade 130 is in inverse proportion to the length. However, the rough outer circumference surface 132 of the rollup blade 130 may prevent a ghost image without reducing a driving speed.

The rollup blade 130 of the light screening apparatus 100 may not be limited to have a rough outer circumference surface 132. For example, a top surface 122 of the material layer 120 may be rough, or both the outer circumference surface 132 of the rollup blade 130 and the top surface 122 of the material layer 120 may be rough. However, in a case in which the top surface 122 of the material layer 120 is rough, the light passing through the light transmitting portion 110*a* may be scattered. Thus, it may be more advantageous for some applications, for example, imaging devices, which put more importance on image quality, to have only the outer circumference surface 132 of the rollup blade 130 to be rough because the rough top surface 122 of the material layer 120 may cause scattering of the light which passes through light transmitting portion 110*a*.

Figure 3:
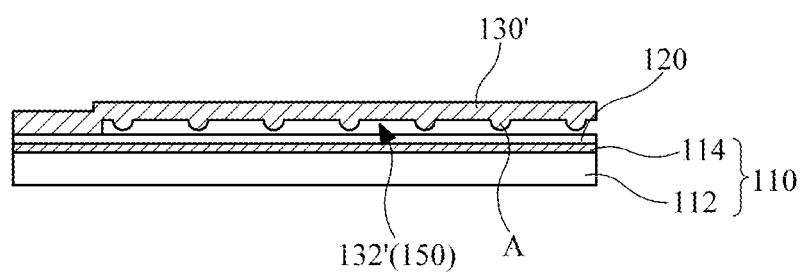
FIG. 3 is a cross-sectional view showing an example of a light screening apparatus according to another exemplary embodiment.

As such, the sticking prevention structure 150 may refer to inherent characteristics of the surface of at least one of the rollup blade 130 and the material layer 120. FIG. 3 illustrates a side view of an example of a light screening apparatus including a rollup blade 130' whose surface characteristics are utilized as a sticking prevention structure, according to another exemplary embodiment. For convenience of explanation, the rollup blade 130' is illustrated as being flattened. Referring to FIG. 3, the rollup blade 130' is not even throughout its entire length, but rather has protruding portions A. The surface of the rollup blade 130' with the protruding portions A may operate as the sticking prevention structure because the protruding portions A reduce the contact area between the rollup blade 130' and a material layer 120.

In the example illustrated in FIG. 3, an outer circumference surface 132' of the rollup blade 130' is bumpy with a plurality of the protruding portions A. Referring to FIG. 3, the rollup blade 130' has the protruding portions A on the outer circumference surface 132'. However, it is understood that one or more other exemplary embodiments are not limited thereto. For example, according to another exemplary embodiment, the outer circumference surface 132' may have recess portions, or both the protruding portions and the recess portions (e.g., embossing and dimples), which are included in modification of the bumpy surface of the rollup blade 130'. Furthermore, according to one or more other exemplary embodiments, the bumpy surface is not limited to being formed on the circumference surface of the rollup blade 130', but a top surface of the material layer 120 or both the circumference surface of the rollup blade 130' and the top surface of the material layer 120 may be formed as being bumpy.

At least one of the protruding portions A and the recess portions (not shown) on the outer circumference surface 132' of the rollup blade 130' may result in the reduction of substantial contact area between the rollup blade 130' and the material layer 120 (see FIG. 1). Thus, the sticking phenomenon of the rollup blade 130' due to dielectric charging may be prevented. Such protruding portions A (or recess portions) in the form of dots may be evenly, unevenly, or randomly distributed on a part or the whole of the outer circumference surface 132' of the rollup blade 130'. Furthermore, the protruding portions A may or may not have to have a uniform size. Moreover, the protruding portions A may be line-shaped (e.g., a straight line or a curved line), and the outer circumference surface 132' of the rollup blade 130' may be in a variety of shapes, including a wavy shape, with the line-shaped protruding portions A.

Unlike the examples described above, in which the shape of the surface of at least one of the rollup blade and the material layer operate as a sticking prevention structure, the sticking prevention structure of the light screening apparatus 100 may be a predefined additional material layer (a sticking prevention layer) or a material pattern (sticking prevention pattern) which is further formed on at least one of an outer circumference surface of the rollup blade and a top surface of the material layer. In this example, the outer circumference surface of the rollup blade or the top surface of the material layer may not be the sticking prevention structure, or may include the sticking prevention structure in combination with the additional material layer or material pattern. The 'sticking prevention pattern' and the 'sticking prevention layer' are relative to each other, where the sticking prevention layer has a comparatively larger area than the sticking prevention pattern. For example, where the sticking prevention layer may be formed on the entire surface at least one of the rollup blade and the material layer or on a predefined region corresponding to the light transmitting portion of the base plate, multiple sticking prevention patterns may be formed in the form of islands (e.g., dot type) or lines on the top surface of at least one of the rollup blade and the material layer.

The additional sticking prevention layer or the sticking prevention pattern as the sticking prevention structure may be made of electrically conductive material. Moreover, the sticking prevention layer or the sticking prevention pattern to be formed on the outer circumference surface of the rollup blade may be made of an opaque material, but is not limited thereto. However, the sticking prevention layer or the sticking prevention pattern to be formed on the top surface of the insulating layer may be made of a transparent material, an opaque material, a combination of both, or a composite material including transparent and opaque portions. As long as satisfying the above-described characteristics, the types of material that are included in the sticking prevention layer or the sticking prevention pattern are not limited. For example, the sticking prevention layer or the sticking prevention pattern may be made of AgO or $CuCl_x$ (where x may be 1, 2, 3, or 4), which will be described below with reference to FIGS. 8A to 8F and 9.

The additional sticking prevention layer or the sticking prevention pattern may have the same surface characteristics as the outer circumference surface of the rollup blade as described with reference to FIGS. 1 to 3 so as to operate as the sticking prevention structure. For example, the sticking prevention layer or the sticking prevention pattern may have a rough surface (see FIG. 7E). As another example, although the sticking prevention layer has a smooth surface from a microscale view, the sticking prevention layer may have a structure with at least one of protruding portions and recess portion on the surface, that is, a bumpy surface. As another example, the sticking prevention pattern formed on a smooth outer circumference surface the rollup blade may be a protruding portion (see FIG. 9). On the other hand, the additional sticking prevention layer may be porous because such a porous sticking prevention layer can reduce contact area (see FIG. 8F).

Still referring to FIGS. 1 and 2, the driving unit 140 may be electrically connected to the lower electrode 114 of the base plate 110 and the upper electrode included in the rollup blade 130. Additionally, the driving unit 140 may apply driving voltages of opposite electrical potentials to the lower electrode 114 and the upper electrode of the rollup blade 130 to flatten the moving portion 130b of the rollup blade 130.

FIGS. 4A and 4B illustrate perspective views of an example of a light screening apparatus according to another exemplary embodiment. In FIG. 4A, the light screening apparatus 200 is in a state to screen light, and in FIG. 4B, the light screening apparatus 200 is in a state to allow the transmission of light. The light screening apparatus 200 shown in FIGS. 4A and 4B may be used as a mechanical optical shutter for an imaging device, which is only explanatory and it is understood that one or more other exemplary embodiments are not limited thereto.

As shown in FIGS. 4A and 4B, the light screening apparatus 200 may include a plurality of rollup blades 230. Each of the rollup blades 230 may include a moving portion and a fixing portion, and the fixing portions of the rollup blades 230 are fixed along an edge of a circular shaped light transmitting portion 210a of a base plate 210. The moving portion of each rollup blade 220 is radially arranged from the center of the light transmitting portion 210a of the base plate 210 as shown in FIG. 4A. The entire light transmitting portion 210a is covered by a plurality of the rollup blades 230, where the moving portion of each rollup blade 230 covers one of radially divided areas of the light transmitting portion 210a.

The light screening apparatus 100 illustrated in FIGS. 1 and 2 may be considered as an enlarged view of one of the rollup blades 230 constructing the light screening apparatus 200 illustrated in FIGS. 4A and 4B. Hereinafter, the light screening apparatus 200 will be described focusing on differences from the light screening apparatus 100 illustrated in FIGS. 1 and 2.

Referring to FIGS. 4A and 4B, the light screening apparatus 200 may include the base plate having the light transmitting portion 210a. The light transmitting portion 210a may be circular, oval, polygonal, or the like. The base plate 210 may include a transparent substrate and a lower electrode disposed on the transparent substrate. The base plate 210 may have a material layer 220 formed thereon, which may cover at least a portion or all of the light transmitting portion 210a. For example, according to an exemplary embodiment, the material layer 220 may cover all of the light transmitting portion 210a. Moreover, according to another exemplary embodiment, the material layer 220 may cover only sections of the light transmitting portion 210a that are overlapped by the rollup blades 230 in a shuttering state. For example, sections of the light transmitting portion 210a that are not overlapped by two adjacent rollup blades 230 (e.g., gaps, creases, border lines, or uncovered areas between two adjacent rollup blades 230) in a shuttering state may not be covered by the material layer 220. In this case, these uncovered sections of the light transmitting portion 210a may themselves be opaque, or may have opaque projections (e.g., metal projections) that project therefrom and are surrounded by the material layer 220. Moreover, in this case, the material layer 220 itself may cover the entirety of light transmitting portion 210a, but may be opaque in those areas corresponding to the sections of the light transmitting portion 210a that are not overlapped by the rollup blades 230. The material layer 220 may include an insulating layer formed of, for example, an electrically conductive material.

The light screening apparatus 200 may include a plurality of the rollup blades 230. Each of the rollup blades 230 may have an outer circumference surface 232 formed as a sticking prevention structure. However, for convenience of illustration, details of the outer circumference surface 232 with the sticking prevention structure are not shown in FIG. 4B. For example, the outer circumference surface 232 of each rollup blade 230 may be rough or bumpy. As another example, a sticking prevention layer or a sticking prevention pattern may be disposed on the outer circumference surface 232 of each rollup blade 230.

The fixing portion of each rollup blade 230 that is a rollup actuator may be fixedly arranged on the base plate 210 or the material layer 220 to form various shapes of the light transmitting portion 210a (e.g., circular, oval, polygonal, etc.). In addition, when the rollup blades 230 are driven by the driving unit 240, the moving portions of the rollup blades 230 are flattened as shown in FIG. 4A. Each moving portion of the rollup blades 230 may have a pie shape (i.e., triangular shape) and a corner of the pie shape may be substantially aligned at the center of the light transmitting portion 210a with a predefined angle. It is understood that one or more other exemplary embodiments are not limited to pie shaped moving portions. That is, according to one or more other exemplary embodiments, the moving portions may be of any shape and moving portions of different rollup blades 230 may be of different shapes. Each moving portion of the rollup blades 230 covers a corresponding one of the divided areas of the light transmitting portion 210a. When the rollup blades 230 are flattened, there may be a gap formed between neighboring rollup blades 230, or at least between the moving portions of neighboring rollup blades 230. Alternatively, the fixing portions of neighboring rollup blades 230 may be arranged without a gap by, for example, forming a mechanical coupling between the moving portions of the neighboring rollup blades 230.

Referring to the examples illustrated in FIGS. 4A and 4B, the light transmitting apparatus 200 may include a driving unit 240 which is electrically connected to the base plate 210 and the rollup blades 230. When there is a driving force controlled by the driving unit 240, the moving portions of the rollup blades 230 may be flattened as shown in FIG. 4A. The driving unit 240 may control the rollup blades 230 simultaneously or individually. In addition, the driving unit 240 may be able to adjust a degree of how rolled-up or flattened the rollup blades 230 are to control the size of the opened aperture of the light transmitting portion 210a.

When there is no driving voltage from the driving unit 240, the moving portions of the rollup blades 230 are maintained in the rolled-up state as illustrated in FIG. 4B due to the presence of residual stress in the rollup blades 230. The difference between the residual stresses of the material layers of the rollup blade 230 may cause a rollup of the driving portion of each rollup blade 230. The moving portion of each rollup blade 230 is rolled up outward from the center of the light transmitting portion 210a as shown in FIG. 4B in which the light transmitting portion 210a of the base plate 210 is fully exposed to the incident light, and thereby allowing light to pass through the light transmitting portion 210a. When a driving voltage is applied by the driving unit 240 between the base plate 210 and the rollup blades 230, the moving portions of the rollup blades 230 are flattened to cover the light transmitting portion 210a as shown in FIG. 4A, and thereby prevent light from passing through the light transmitting portion 210a.

Figure 5:
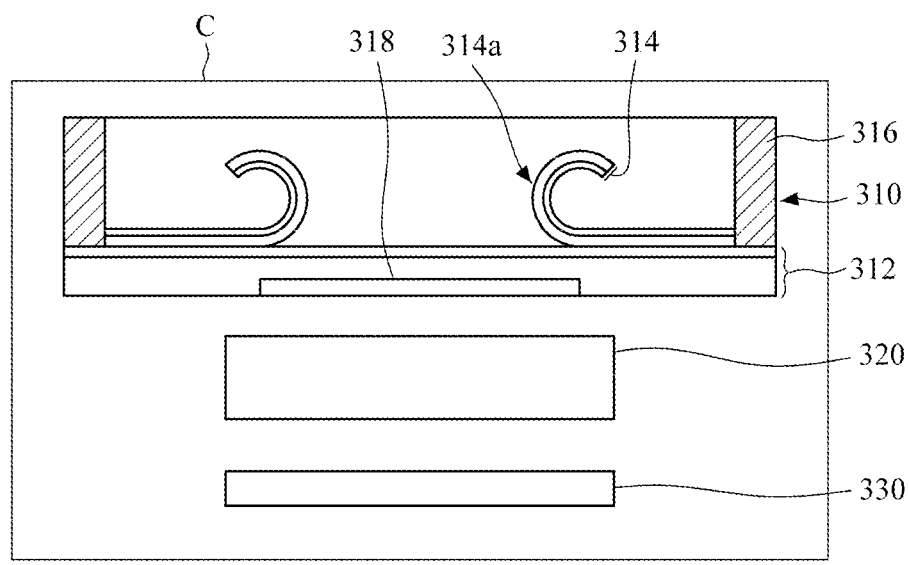
FIG. 5 is a cross-sectional view showing an example of an imaging device including a light screening apparatus according to an exemplary embodiment.

FIG. 5 illustrates a cross-sectional view of an example of an imaging device C including a light screening apparatus according to an exemplary embodiment. Referring to FIG. 5, the imaging device C may include a light screening apparatus 310, a lens unit 320, and an image sensor 330.

The light screening unit 310 may be similar to the light screening apparatus 200 illustrated in FIGS. 4A and 4B, but is not limited thereto. For convenience of illustration, a driving unit of the light screening apparatus 310 is not shown. In the light screening apparatus 310, an outer circumference surface 314a of each rollup blade 314 may be rough or bumpy, or may have a sticking prevention layer or a sticking prevention pattern (not shown) formed thereon.

Referring to FIG. 5 again, a spacer frame 316 may be disposed on a base plate 312 of the light screening apparatus 310 to protect the rollup blades 314. For example, the spacer frame 316 may be positioned on an edge portion of the base plate 312 which is not covered by the rollup blades 314 as shown in FIG. 5. Alternatively, a transparent cover (not shown) instead of the spacer frame 316 may be placed on the base plate 312 where the transparent cover is able to cover the entire base plate 312 while providing a sufficient inner space for movement of the rollup blades 314. Other optical components, such as a filter, a lens, etc., which are used to adjust the amount of light passing through the light transmitting portion, may be further disposed on the base plate 312 of the light screening apparatus 310.

The lens unit 320 is an optical focusing system which focuses the light passing through the light transmitting portion of the base plate 312 on to the image sensor 330. The lens unit 320 may include one or more lenses, and may include a device that can adjust the focal distance of the imaging device C. An additional lens unit (not shown) may be further disposed over the light screening apparatus 310.

The image sensor 330 may receive the light passing through the light transmitting portion and form images, and the image sensor 330 may have a plurality of pixels. The image sensor 330 used in the example illustrated in FIG. 5 is not limited to a certain type. For example, the image sensor 330 may be a complementary metal oxide semiconductor (CMOS) image sensor, a charge coupled device (CCD), etc. When the rollup blades 314 are in the flattened state, the entire light transmitting portion is covered by the rollup blades 314 and the image sensor 330 receives no light.

FIGS. 6A to 6E illustrate cross-sectional views of a light screening apparatus for explaining an example of a method of fabricating the light screening apparatus which has a rollup blade 130 whose outer circumference surface operates as a sticking prevention structure according to an exemplary embodiment. The light screening apparatus shown in the example illustrated in FIGS. 6A to 6E may be the light screening apparatus 100 shown in FIGS. 1 and 2 or the light screening apparatus 200 shown in FIG. 3. Hereinafter, a manufacturing method of the light screening apparatus 100 shown in FIGS. 1 and 2 will be described with reference to FIGS. 6A to 6E.

Figure 6A:
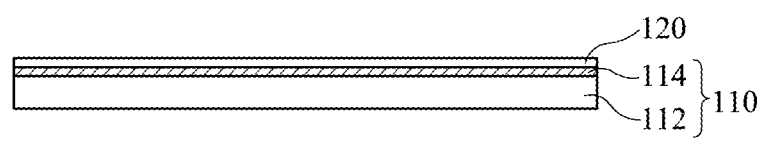
FIGS. 6A to 6E are cross-sectional views of a light screening apparatus for explaining an example of a method of fabricating the light screening apparatus according to an exemplary embodiment.

Referring to FIG. 6A, a base plate 110 is provided. Various methods may be used to form the base plate 110. For example, the base plate 110 may be formed by disposing a lower electrode 114 on a substrate 112 including a transparent or translucent light transmitting portion. The entire substrate 112 may be a transparent glass substrate. The lower electrode 114 may be made of a transparent conductive material such as ITO or a translucent conductive material. Various methods of forming the lower electrode 114 on the substrate 112 may be used. For example, general semiconductor manufacturing methods such as physical vapor deposition (PVD), evaporation, or the like may be utilized. The lower electrode 114 may have a thickness ranging from about 1000 Å to about 3000 Å, and for example, a thickness of about 2000 Å.

Then, the material layer 120, for example, an insulating layer, may be formed or provided on the lower electrode 114. Moreover, one or more material layers (not shown) may be further formed prior to or subsequent to the formation of the material layer 120. The material layer 120 may be made of a transparent or translucent insulating material. For example, the material layer 120 may be formed of SiO, SiN, SiON, AN, or the like. Methods of forming the material layer 120 including an insulating layer may not be limited, and general semiconductor manufacturing methods such as chemical vapor deposition (CVD) may be employed. The material layer 120 may have a thickness ranging from about 1000 Å to about 4000 Å, for example, about 1500 Å. Prior to formation of the material layer 120, an electrode pad (not shown) for electrically connecting the lower electrode 114 to an external unit (e.g., the driving unit 140 shown in FIG. 1) may be additionally disposed on an end (e.g., a portion other than the light transmitting portion) of the lower electrode 114.

Figure 6B:
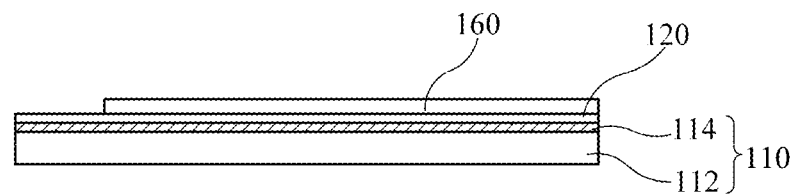

Referring to FIG. 6B, a sacrificial layer 160 is formed or provided on the insulating layer 120. The scarification layer 160 may be made of a material having a coefficient of thermal expansion (CTE) which is substantially different from that of a rollup blade 130 to be formed above the sacrificial layer 160. The sacrificial layer 160 is to be removed after the rollup blade 130 has been formed. Thus, the sacrificial layer 160 may be made of a material that has high etching selectivity with respect to the base plate 110, the material layer 120, and the rollup blade 130 to be formed later, or a material that can be easily removed. For example, the sacrificial layer 160 may be made of a material which is easily removed by an ashing process, or a material, such as polymer of parylene group, photoresistor of acrylate group, photoresistor of novolak group, or the like, which has a relatively greater CTE than a conductive metal material.

The sacrificial layer 160 may be designed or provided to cover at least the light transmitting portion of the base plate 110. For example, the sacrificial layer 160 may be formed or provided on a part of the material layer 120 as shown in FIG. 6B. The sacrificial layer 160 may not be disposed on an edge of the light transmitting portion, that is, the remaining portion of the material layer 120 other than the light transmitting portion on which a fixing portion of the rollup blade 130 is disposed (see FIG. 6D). The sacrificial layer 130 may be partially formed on the material layer 120 by a general semiconductor manufacturing process, for example, an etching process in which an additional material layer is formed on the entire surface of the material layer 120 and is partially etched away, or a method of selectively depositing or applying the sacrificial layer 160 on the material layer 120.

Figure 6C:
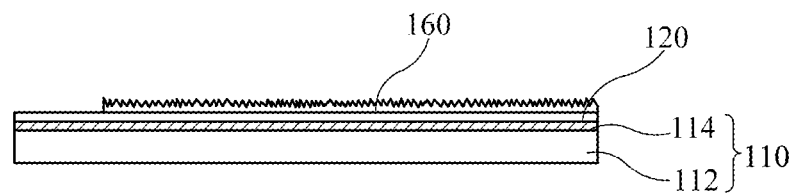

Referring to FIG. 6C, a process to increase surface roughness of the sacrificial layer 160 is carried out. Through this process, the sacrificial layer 160 may be caused to have a rough surface. Various methods may be used to roughen the surface of the sacrificial layer 160. For example, a physical etch process using an inert gas in a plasma state such as argon plasma may be performed to increase the surface roughness.

Figure 6D:
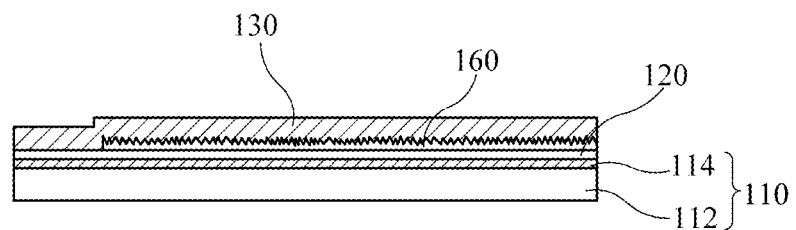

Referring to FIG. 6D, the rollup blade 130 is formed or provided on a structure resulting from the process of FIG. 6C, more specifically, on an exposed material layer 120 and the sacrificial layer 160. The rollup blade 130 may be formed as a single opaque metal layer made of Mo, Al, Ti, Ta, Cr, Au, Cu, or a combination thereof, or may be formed as multiple material layers formed of various materials having different residence stresses. Moreover, in a case of a plurality of rollup blades 130 as shown in FIGS. 4A and 4B, a single metal material thin film may be formed and then patterned by a general semiconductor etching process, for example, dry etching or the like.

As such, the rollup blade 130 is formed on the sacrificial layer 160. Hence, a surface of the rollup blade 130, more specifically, a lower surface of the rollup blade 130, may be enabled to have characteristics transferred from a top surface of the sacrificial layer 160. In the example illustrated in FIGS. 6A to 6E, the top surface of the sacrificial layer 160 has a rough surface as a result of the process shown in FIG. 6C, and correspondingly, the lower surface (i.e., an outer circumference surface) of the rollup blade 130 may be able to have a rough surface. In order to form at least one of a protruding portion and a recess portion on one surface of the rollup blade 130 as shown in FIG. 3, at least one of a recess portion and a protruding portion is formed on the top surface of the sacrificial layer 160 shown in FIG. 6C and then the rollup blade is formed thereon. Various methods may be used to form the recess portion and the protruding portion.

The residual stress in the rollup blade 130 and a resultant stress gradient may be controlled by adjusting at least one of a CTE and a thickness of the sacrificial layer 160 formed below the rollup blade 130. The curvature of the rollup blade 130 which is a degree of how spontaneously the rollup blade 130 rolls up after removing the sacrificial layer 160 may be controlled with the stress gradient in the rollup blade 130. Alternatively, in the case of the rollup blade 130 formed as a plurality of layers, at least one of fabricating conditions for and a thickness of each layer of the rollup blade 130 may be adjusted to control the residual stress in each layer.

Figure 6E:
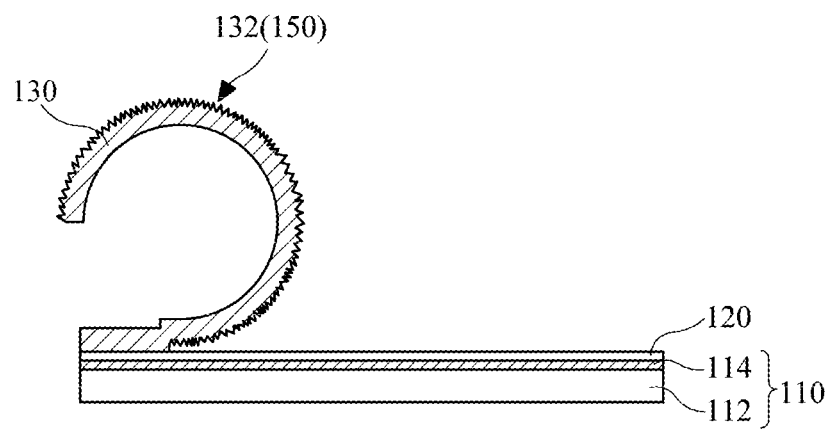

Referring to FIG. 6E, the sacrificial layer 160 is removed from the structure resulting from the process shown in FIG. 6D. Various methods may be used to remove the sacrificial layer 160, and may include a polymer removal process such as an ashing process and a semiconductor etching process such as wet etching. Once the sacrificial layer 160 is removed, the rollup blade 130 spontaneously rolls up due to the presence of the residual stress therein. The outer circumference surface 132 of the rollup blade 130 is rough, which may operate as a sticking prevention structure.

As described above, the surface roughness of the sacrificial layer 160 is increased and then the rollup blade 130 is formed on the sacrificial layer 160 so that the outer circumference surface 132 of the rollup blade 130 can be rough. Alternatively, at least one of a recess portion and a protruding portion is formed on the top surface of the sacrificial layer 160 so that the outer circumference surface 132 of the rollup blade 130 can have at least one of a protruding portion and a recess portion in reverse to the sacrificial layer 160.

As another example for making the outer circumference surface 132 of the rollup blade 130 rough, a roughening process may be additionally carried out after the material layer 120 is formed in the process shown in FIG. 6A. More specifically, after the process shown in FIG. 6A, the surface roughness of the top surface of the material layer 120 is increased (or a recess portion or a protruding portion is formed), and then the sacrificial layer 160 is formed on the roughened top surface of the material layer 120 as shown in FIG. 6B. Thereafter, without the process shown in FIG. 6C, the rollup blade 130 is directly formed on the sacrificial layer 160. In this case, the rough surface of the material layer 120 is transferred to the sacrificial layer 160, and as a result, the outer circumference surface 132 of the rollup blade 130 formed on the sacrificial layer 160 may be rough (or have a protruding portion or a recess portion).

FIGS. 7A to 7F illustrate cross-sectional views of a light screening apparatus for explaining an example of a method of fabricating the light screening apparatus according to another exemplary embodiment. The light screening apparatus shown in FIGS. 7A to 7F may have a sticking prevention structure 450 additionally formed on an outer circumference surface of a rollup blade 430. The method shown in the example illustrated in FIGS. 7A to 7F will be described focusing on differences from the method shown in the example illustrated in FIGS. 6A to 6E.

Figure 7A:
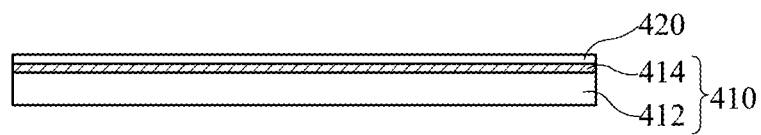
FIGS. 7A to 7F are cross-sectional views of a light screening apparatus for explaining an example of a method of fabricating the light screening apparatus according to another exemplary embodiment.

Referring to FIG. 7A, a base plate 410 is provided. Various methods may be used to form the base plate 410. For example, the base plate 410 may be formed by disposing a lower electrode 414 on a substrate 412 having a transparent or a translucent light transmitting portion. Then, an insulating layer 420 is formed on the base plate 410. The insulating layer 420 may be made of a transparent or a translucent insulating material.

Figure 7B:
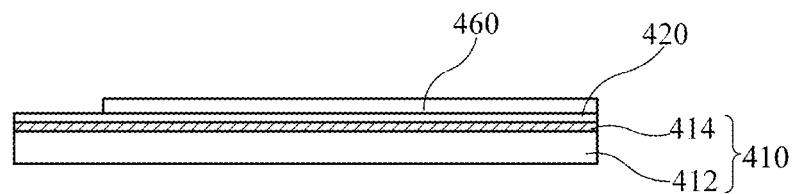

Referring to FIG. 7B, a sacrificial layer 460 may be formed on the insulating layer 420.

Figure 7C:
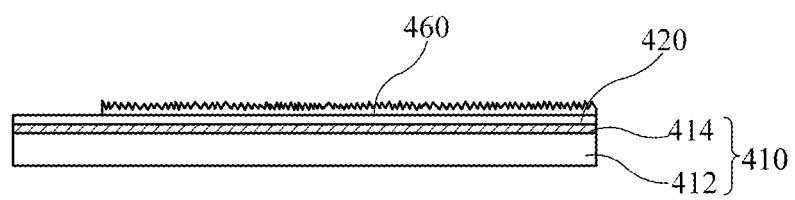

Referring to FIG. 7C, a process to increase a surface roughness of the sacrificial layer 460, i.e., to make the sacrificial layer 460 have a rough surface, may be carried out. Various methods may be used to roughen the surface of the sacrificial layer 460. For example, a physical etch process using an inert gas in plasma state such as argon plasma may be performed to increase the surface roughness of the sacrificial layer 460.

Figure 7D:
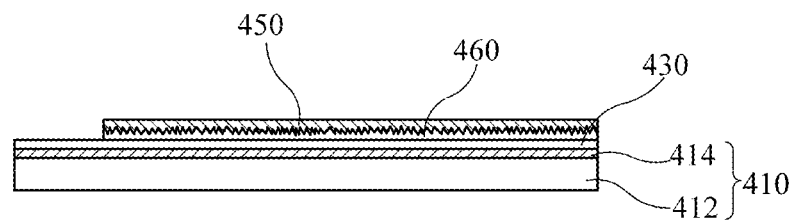

Referring to FIG. 7D, a predefined additional material layer to operate as a sticking prevention structure, that is, a sticking prevention layer 450, may be formed on the rough surface of the sacrificial layer 460. The sticking prevention layer 450 may have a rough surface which is transferred from the sacrificial layer 460. The sticking prevention layer 450 may be made of an electrically insulating material or any other material. Since the sticking prevention layer 450 remains on an outer circumference surface of the rollup blade 430 after the process is completed, the sticking prevention layer 450 may be made as thin as possible to minimize the reduction of driving speed. On the other hand, a sticking prevention pattern (not shown) such as protruding portions may be additionally formed on the sacrificial layer 460, where the protruding portions may remain on the outer circumference surface of the rollup blade 430 after the sacrificial layer 460 has been removed.

Figure 7E:
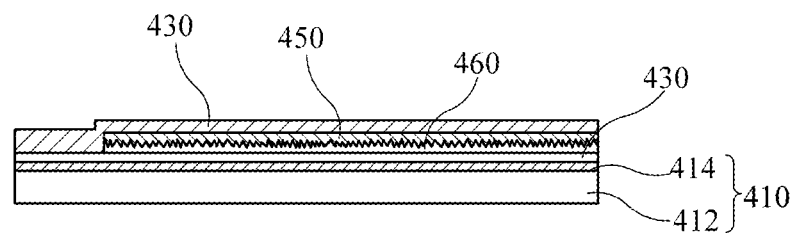
Figure 7F:
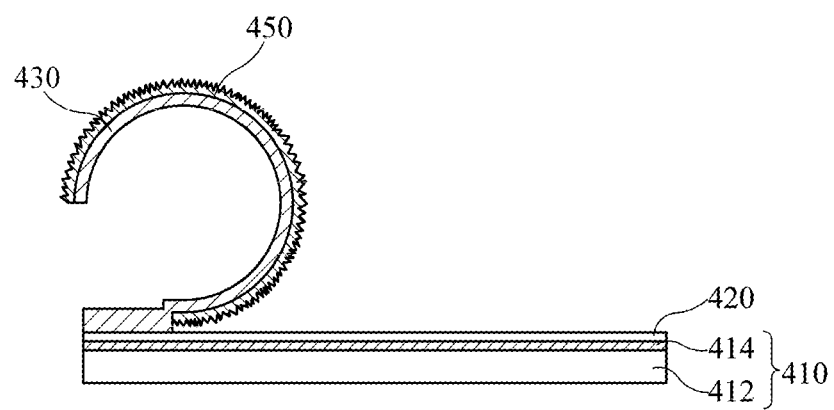

Referring to FIG. 7E, the rollup blade 430 may be formed on the sticking prevention layer 450 that is a structure resulting from the process shown in FIG. 7D. Referring to FIG. 7F, the sacrificial layer 460 is selectively removed from the structure shown in FIG. 7E. Various methods may be used to remove the sacrificial layer, and may include a polymer removal process such as an ashing process and a semiconductor etching process such as wet etching. Once the sacrificial layer 460 is removed, the rollup blade 430 spontaneously rolls up due to the presence of a stress gradient inside as shown in FIG. 7F, in which the outer circumference surface of the rollup blade 430 has the sticking prevention layer 450 with a rough surface or a sticking prevention pattern formed thereon.

FIGS. 8A to 8F illustrate cross-sectional views of a light screening apparatus for explaining an example of a method of fabricating the light screening apparatus according to another exemplary embodiment. The light screening apparatus shown in FIGS. 8A to 8F may include a sticking prevention structure 550 formed on an outer circumference surface of a rollup blade 530.

Figure 8A:
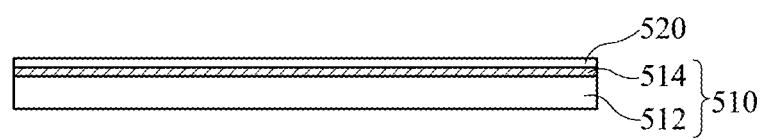
FIGS. 8A to 8F are cross-sectional views of a light screening apparatus for explaining an example of a method of fabricating the light screening apparatus according to another exemplary embodiment.
Figure 8B:
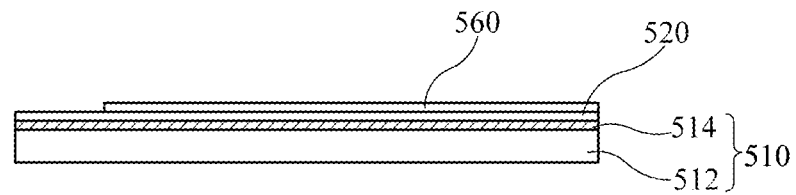

Referring to FIG. 8A, a base plate 510 is provided. There may be various methods to form the base plate 510. For example, the base plate 510 may be formed by disposing a lower electrode 514 on a substrate 512 having a transparent or a translucent light transmitting portion. Then, a material layer 520 including an insulating layer may be formed on the base plate 510. The insulating layer of the material layer 520 may be made of a transparent or a translucent insulating material. Referring to FIG. 8B, a sacrificial layer 560 may be formed on the material layer 520. The sacrificial layer 560 may be formed to cover at least the light transmitting portion of the base plate 510. A process to increase surface roughness of the sacrificial layer 560 may be further performed.

Figure 8C:
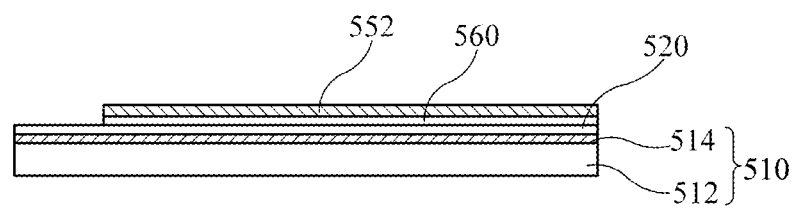

Referring to FIG. 8C, a metal thin film 552 may be disposed on the sacrificial layer 560. The metal thin film 552 may be made of Ag or Cu, which will be described in detail below. The metal thin film 552 may be made as thin as possible to be transformed to a porous structure by a plasma process and to minimize the reduction of driving speed of the rollup blade. The plasma process will be described below.

Figure 8D:
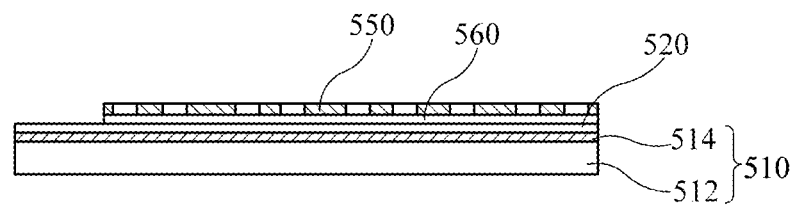

Referring to FIG. 8D, a predefined plasma surface process is performed on the metal thin film 552 shown in FIG. 8C so that a sticking prevention structure is formed on the sacrificial layer 560. The sticking prevention structure may be a metal thin film having a surface with a roughness increased by the plasma process. Alternatively, the sticking prevention structure may be a sticking prevention layer 550 which is transformed to a porous structure by oxygen or chlorine plasma process. The sticking prevention layer 550 with a porous structure may also have a rough surface.

The metal thin film 552 may be made of a metal material with a high responsiveness to a gas such as oxygen or chlorine, such that it can be transformed to a sticking prevention structure having a rough surface due to an oxygen or chlorine plasma process or a sticking prevention layer 550 with a porous structure.

For example, the metal thin film 552 may be made of Ag or Cu. The metal thin film 552 formed of Au may react to oxygen to produce AgO, and the metal thin film 552 formed of Cu may react to chlorine to produce CuCl. As another example, the metal thin film 552 formed of Ag or Cu may have a structure modified to be transformed to a porous structure while AgO or CuCl is produced.

Figure 9:
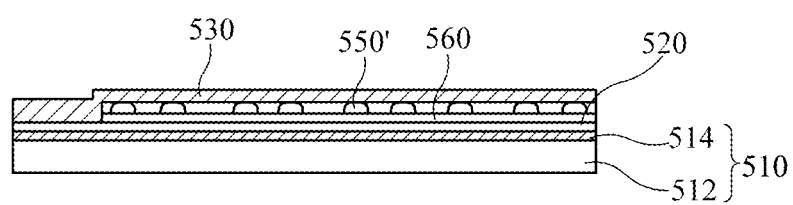
FIG. 9 is a cross-sectional view of an example of a light screening apparatus when an additional thermal process is performed after the process shown in FIG. 8D according to an exemplary embodiment.

The sticking prevention layer 550 with a porous structure, for example, the sticking prevention layer 550 formed of AgO, may further undergo a thermal process. The thermal process with respect to AgO may be performed using Ag. By the thermal process, the sticking prevention layer 550 with a porous structure may be changed to a sticking prevention pattern 550' in the form of islands as shown in FIG. 9. The sticking prevention pattern 550' may be randomly, evenly, or unevenly distributed over the entire surface of the sacrificial layer 560. The sticking prevention structure as described in the above example may be distributed randomly, evenly, or unevenly on the entire surface of the rollup blade or the sacrificial layer. However, according to one or more other exemplary embodiments, the sticking prevention structure may be selectively disposed evenly or randomly on a portion of the surface of the rollup blade or the sacrificial layer.

Figure 8E:
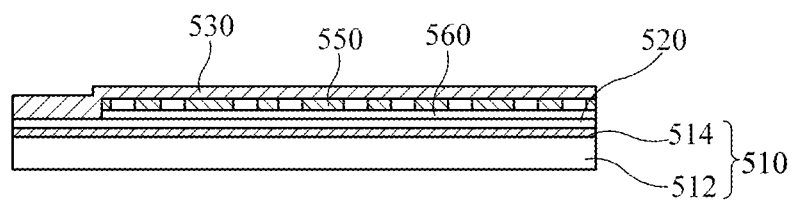
Figure 8F:
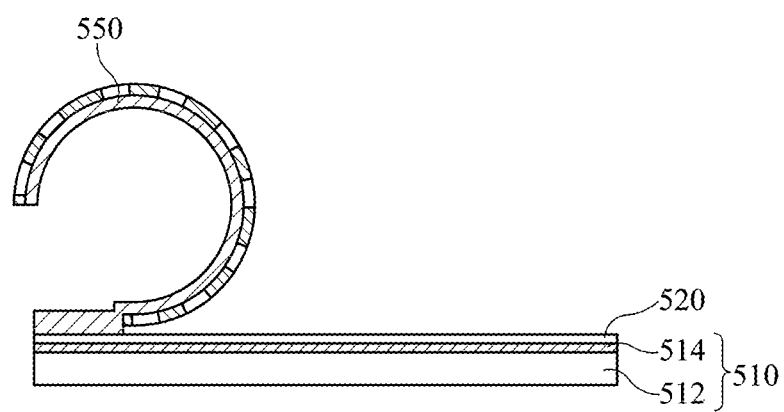

Referring to FIG. 8E, a rollup blade 530 may be formed on a structure resulting from the process shown in FIG. 8D, more specifically, the sacrificial layer 560 on which the sticking prevention layer 550 with a porous structure (or the sticking prevention pattern 550' in the form of islands as shown in FIG. 9). Referring to FIG. 8F, the sacrificial layer 560 is selectively removed from the structure resulting from the process shown in FIG. 8E. Once the sacrificial layer 560 is removed, the rollup blade 530 spontaneously rolls up due to the presence of a stress gradient therein. The sticking prevention layer 550 with a porous structure or the sticking prevention pattern 550' may be additionally formed on an outer circumference surface of the rollup blade 530. In this example, the sticking prevention layer 550 or the sticking prevention pattern 550' may be produced without additional photolithography, and thus the manufacturing cost can be reduced.

As described above, the rollup blade is prevented from being stuck onto the insulating layer even when an electrostatic light screening apparatus is operated for a long time, and thus the life time of the light screening apparatus can be lengthened.

It is understood that one or more other exemplary embodiments are not limited to the above-described sticking prevention structures, and may include any structure or any inherent characteristic of a surface of at least one of the material layer and the rollup blade that results in a reduction of a contact area between the material layer and the rollup blade. For example, any sticking prevention structure that causes the contact area to be within a range greater than or equal to 0.1% and less than or equal to 50% of a total overlapping area between the material layer and the rollup blade, may be provided.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A light screening apparatus comprising:
a base plate comprising a first electrode;
at least one material layer on the base plate;
a rollup blade comprising a second electrode, and configured to be disposed corresponding to a light transmitting portion of the base plate;
a driving unit configured to be electrically connected to the first electrode and the second electrode to control the rollup blade between a rolled-up state to transmit light and a flattened state to screen the light; and a sticking prevention structure which prevents sticking between the rollup blade and the at least one material layer when the rollup blade is controlled to be in the rolled-up state.

2. The light screening apparatus of claim 1, wherein the sticking prevention structure reduces a contact area between the rollup blade and the at least one material layer.

3. The light screening apparatus of claim 2, wherein the sticking prevention structure causes the contact area to be greater than or equal to 0.1% and less than or equal to 50% of a total overlapping area between the rollup blade and the at least one material layer when the rollup blade is in the flattened state.

4. The light screening apparatus of claim 1, wherein the at least one material layer comprises an insulating layer.

5. The light screening apparatus of claim 1, wherein the sticking prevention structure comprises at least one of a rough outer circumference surface of the rollup blade and a rough surface of the at least one material layer facing the rollup blade.

6. The light screening apparatus of claim 5, wherein the at least one of the rough outer circumference surface of the rollup blade and the rough surface of the at least one material layer has a roughness of about 30 nm or more.

7. The light screening apparatus of claim 1, wherein the sticking prevention structure comprises at least one of a bumpy outer circumference surface of the rollup blade and a bumpy surface of the at least one material layer facing the rollup blade.

8. The light screening apparatus of claim 1, wherein the sticking prevention structure comprises at least one of a sticking prevention layer and a sticking prevention pattern which is additionally provided on at least one of an outer circumference surface of the rollup blade and a surface of the at least one material layer facing the rollup blade.

9. The light screening apparatus of claim 8, wherein the sticking prevention layer comprises a material layer with a rough surface or a porous material layer which is provided on the outer circumference surface of the rollup blade.

10. The light screening apparatus of claim 8, wherein the sticking prevention pattern comprises a plurality of protruding portions which are distributed over the outer circumference surface of the rollup blade.

11. The light screening apparatus of claim 10, wherein the plurality of the protruding portions comprises AgO or CuCl.

12. The light screening apparatus of claim 1, wherein the sticking prevention structure is evenly distributed on at least one of a surface of the rollup blade and a surface of the material layer.

13. The light screening apparatus of claim 1, wherein the sticking prevention structure is distributed on a portion of at least one of a surface of the rollup blade and a surface of the material layer.

14. The light screening apparatus of claim 1, wherein the rollup blade comprises a fixing portion and a moving portion, the fixing portion is fixedly arranged on an edge of the light transmitting portion and the moving portion is rolled up toward the fixing portion when the rollup blade is controlled to be in a rolled-up state.

15. The light screening apparatus of claim 1, wherein the driving unit is configured to drive the rollup blade to variably adjust the amount of light passing through the light transmitting portion.

16. The light screening apparatus of claim 1, wherein the rollup blade comprises at least one rollup blade that entirely covers the light transmitting portion.

17. The light screening apparatus of claim 1, wherein:
the rollup blade comprises a first rollup blade and a second rollup blade adjacent to the first rollup blade with a gap therebetween; and
the at least one material layer comprises an opaque portion corresponding to the gap, the base plate comprises an opaque portion corresponding to the gap, or an opaque projections is provided to project from a portion of the base plate corresponding to the gap.

18. The light screening apparatus of claim 1, wherein the first electrode entirely overlaps with the light transmitting portion.

19. The light screening apparatus of claim 1, wherein the driving unit applies a driving voltage such that opposite electrical potentials are formed between the first electrode and the second electrode to control the rollup blade to be in the flattened state.

20. The light screening apparatus of claim 1, wherein the rollup blade comprises a plurality of layers of two or more conductive materials.

21. An imaging device comprising:
an image sensor;
a base plate comprising a first electrode and which is disposed over the image sensor;
at least one material layer on the base plate;
a rollup blade comprising a second electrode and configured to be disposed corresponding to a light transmitting portion of the base plate;
a driving unit configured to be electrically connected to the first electrode and the second electrode to control the rollup blade between a rolled-up state to transmit light and a flattened state to screen the light; and
a sticking prevention structure which prevents sticking between the rollup blade and the at least one material layer when the rollup blade is controlled to be in the rolled-up state.

22. The imaging device of claim 21, wherein the sticking prevention structure comprises at least one of a rough outer circumference surface of the rollup blade and a rough surface of the at least one material layer facing the rollup blade.

23. The imaging device of claim 21, wherein the sticking prevention structure comprises at least one of a bumpy outer circumference surface of the rollup blade and a bumpy surface of the at least one material layer facing the rollup blade.

24. The imaging device of claim 21, wherein the sticking prevention structure comprises at least one of a sticking prevention layer and a sticking prevention pattern which is additionally provided on at least one of an outer circumference surface of the rollup blade and a surface of the at least one material layer facing the rollup blade.

25. The imaging device of claim 21, wherein the sticking prevention structure comprises a protruding portion that is additionally provided on at least one of an outer circumference surface of the rollup blade and a surface of the at least one material layer facing the rollup blade.

26. A method of fabricating a light screening apparatus, the method comprising:
preparing a base plate having a light transmitting portion;
providing at least one material layer on the base plate;
providing a sacrificial layer on the at least one material layer to cover an area corresponding to at least the light transmitting portion;
increasing a surface roughness of the sacrificial layer or forming at least one of a protruding portion and a recess portion on the sacrificial layer;
providing a rollup blade on the sacrificial layer; and
removing the sacrificial layer.

27. The method of claim 26, wherein the increasing the surface roughness comprises etching a surface of the sacrificial layer using an inert gas in a plasma state.

28. The method of claim 26, further comprising:
prior to the providing of the rollup blade, providing a thin film on the sacrificial layer.

29. A method of fabricating a light screening apparatus, the method comprising:
preparing a base plate having a light transmitting portion;
providing at least one material layer on the base plate;
providing a sacrificial layer on the at least one material layer to cover an area corresponding to at least the light transmitting portion;
providing a metal thin film on the sacrificial layer;
forming a sticking prevention layer with a porous structure by performing a plasma process on the metal thin film;
providing a rollup blade on the sticking prevention layer; and
removing the sacrificial layer.

30. The method of claim 29, wherein the metal thin film comprises Ag, and the sticking prevention layer is formed using oxygen plasma.

31. The method of claim 30, further comprising:
forming a sticking prevention pattern by performing a thermal process on the formed sticking prevention layer with the porous structure.

32. The method of claim 29, wherein the metal thin film comprises Cu, and the sticking prevention layer is formed using chlorine plasma.

33. A light screening apparatus comprising:
a base plate comprising a first electrode;
at least one material layer on the base plate;
a rollup blade comprising a second electrode, and configured to be disposed corresponding to a light transmitting portion of the base plate; and
a sticking prevention structure which reduces a contact surface area between the rollup blade and the at least one material layer when the rollup blade is in a flattened state to screen light.

34. The light screening apparatus of claim 33, wherein the sticking prevention structure causes the contact surface area to be greater than or equal to 0.1% and less than or equal to 50% of a total overlapping area between the rollup blade and the at least one material layer when the rollup blade is in the flattened state.

35. The light screening apparatus of claim 33, wherein the sticking prevention structure comprises at least one of a rough outer circumference surface of the rollup blade and a rough surface of the at least one material layer facing the rollup blade.

36. The light screening apparatus of claim 33, wherein the sticking prevention structure comprises at least one of a bumpy outer circumference surface of the rollup blade and a bumpy surface of the at least one material layer facing the rollup blade.

37. The light screening apparatus of claim 33, wherein the sticking prevention structure comprises at least one of a sticking prevention layer and a sticking prevention pattern which is additionally provided on at least one of an outer circumference surface of the rollup blade and a surface of the at least one material layer facing the rollup blade.

* * * * *